United States Patent Office 3,138,409
Patented June 23, 1964

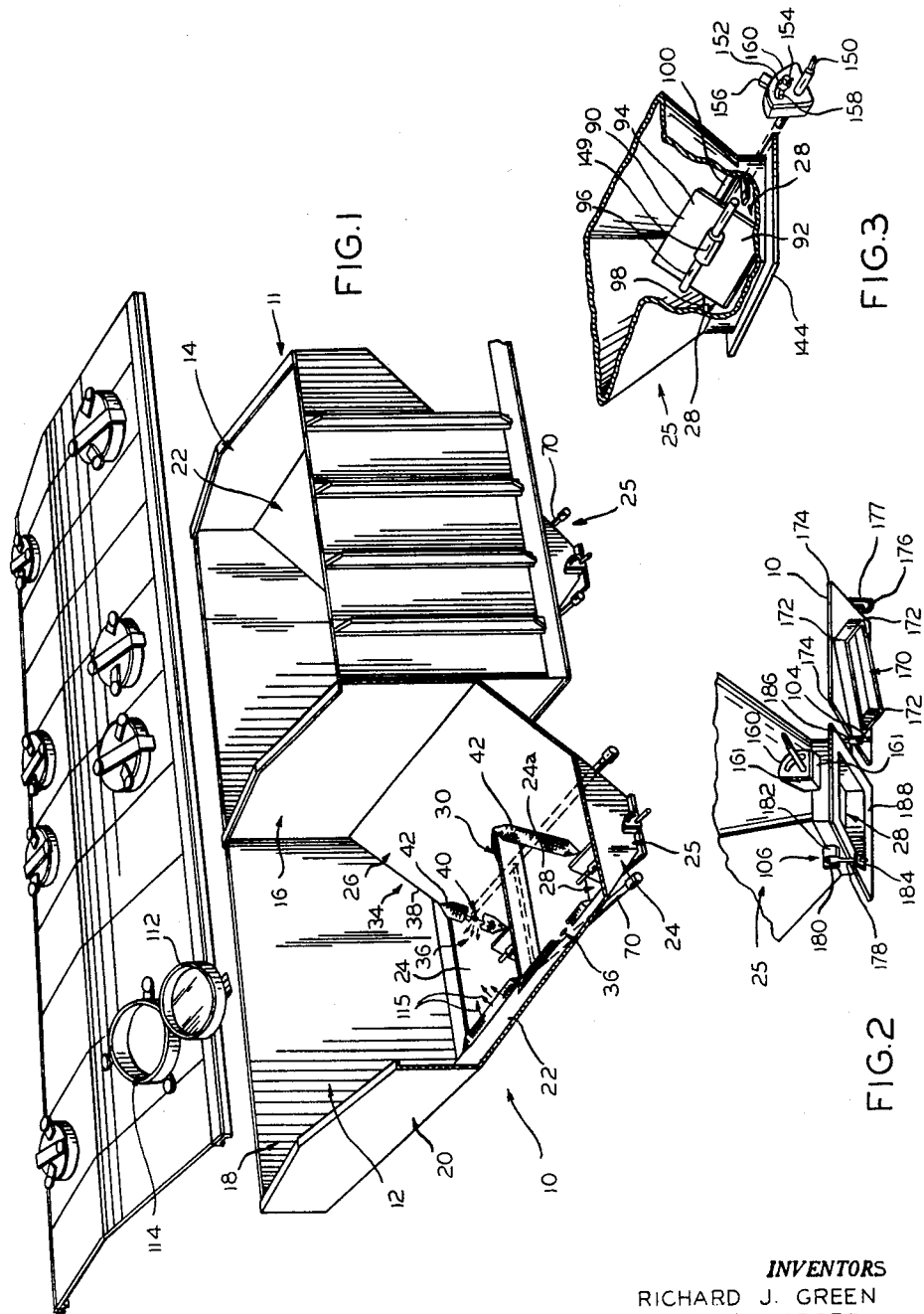

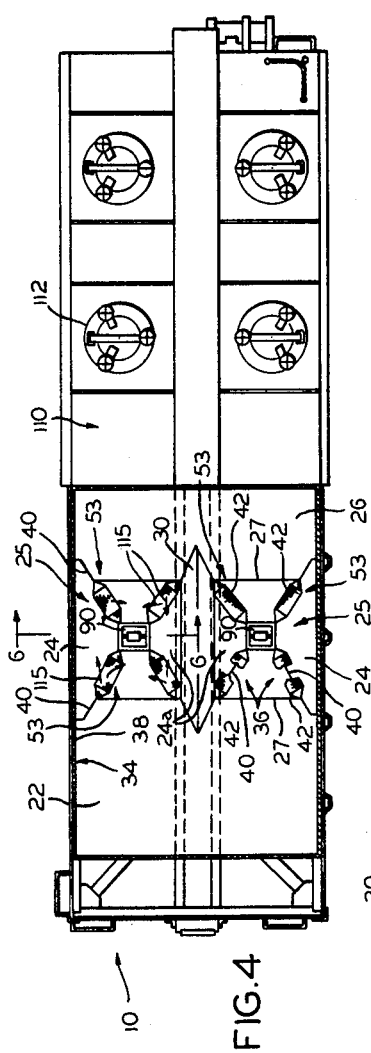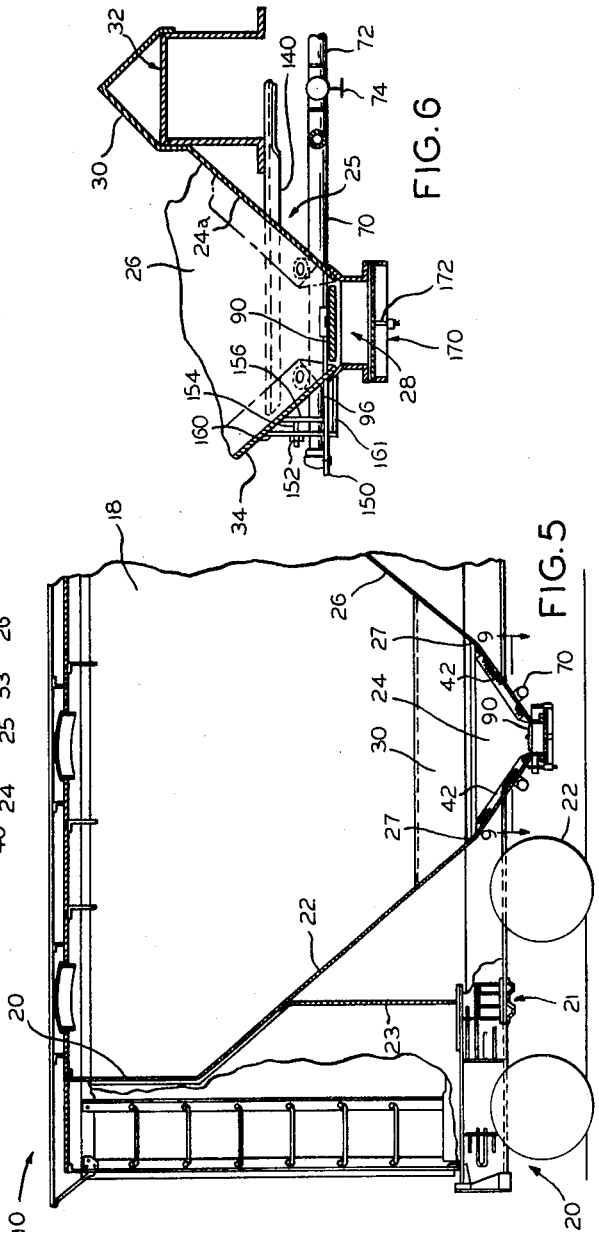

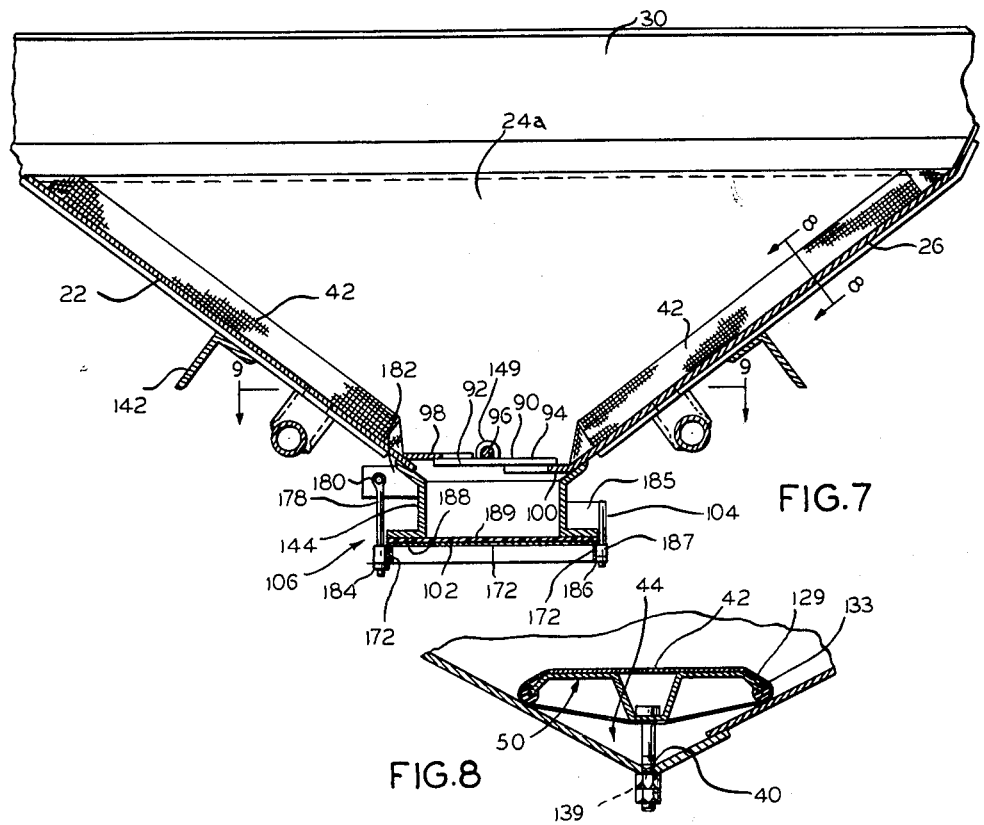
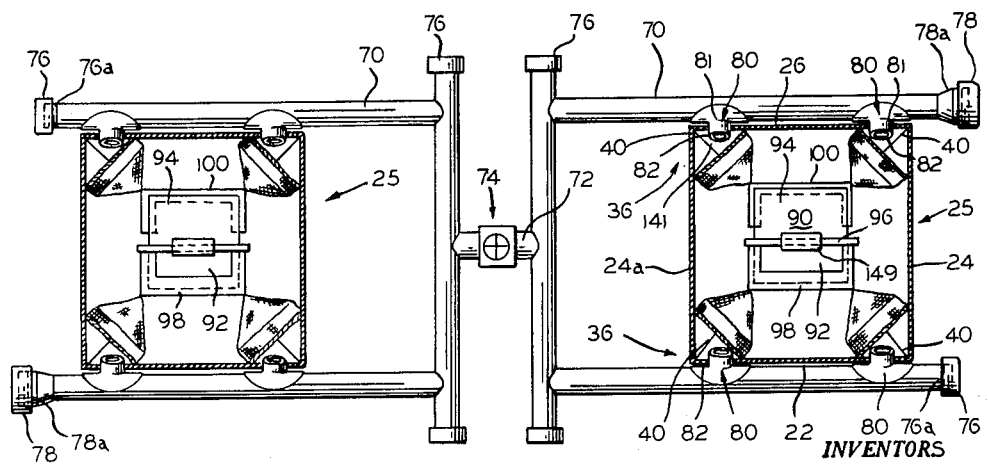

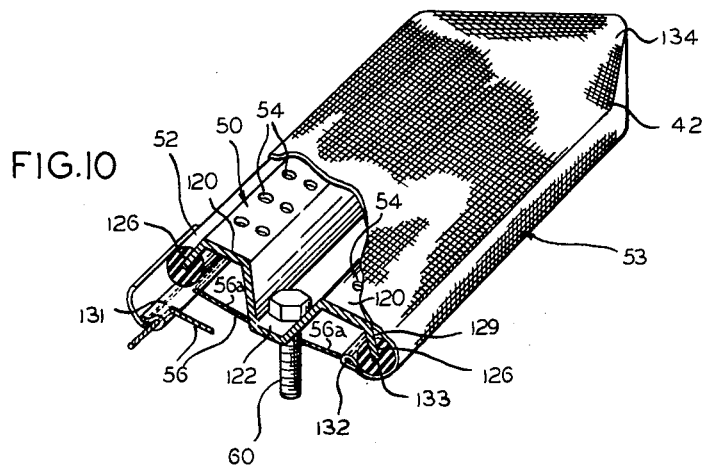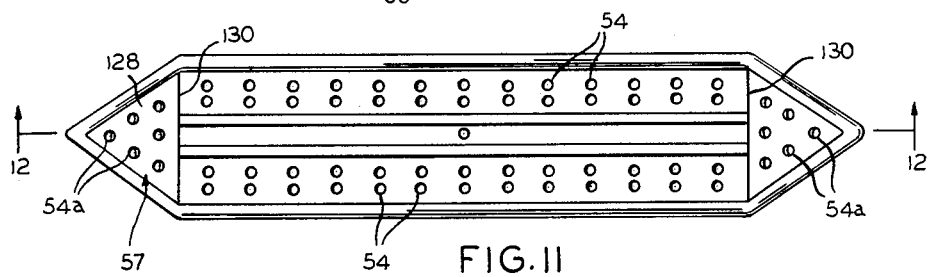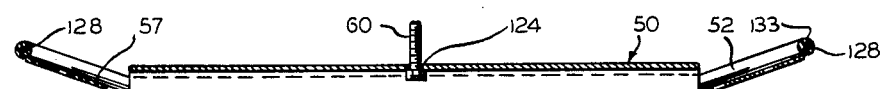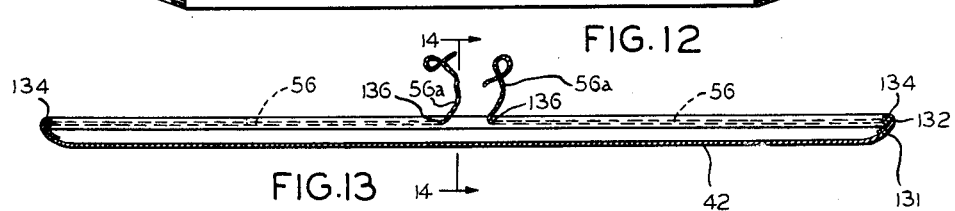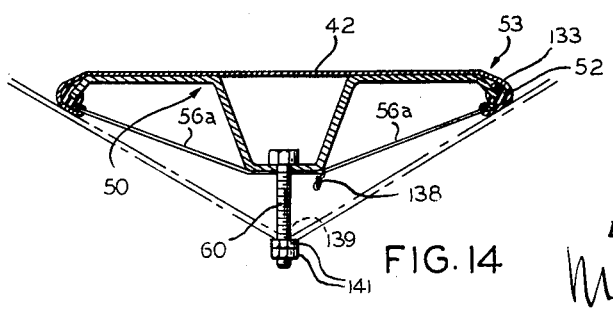

3,138,409
CONTAINER FOR PULVERANT MATERIALS AND APPARATUS FOR UNLOADING SAME
Richard J. Green, Butler, Pa., and Jack W. Borger, Calumet City, Ill., assignors to Pullman Incorporated, Chicago, Ill., a corporation of Delaware
Original application Aug. 19, 1960, Ser. No. 50,800, now Patent No. 3,069,208, dated Dec. 18, 1962. Divided and this application June 28, 1962, Ser. No. 210,286
6 Claims. (Cl. 302—52)

Our invention relates to the storage and handling of pulverant materials, and more particularly, to a railroad car structure to receive and carry such pulverant materials and discharge same therefrom.

Pulverant materials such as flour, cement, and lime, have always represented a problem in being discharged from a storage hopper or bin because of their tendency to compact and the natural adherence between the pulverant particles. The problem is accentuated in the case of transportation of pulverant materials such as these, because the jarring action during transit produces severe compacting, with the result that discharge from the vehicle, even through bottom openings, is faulty and sporadic due to the arching or vaulting of the compact mass between the walls of the container.

Jack W. Borger application Serial No. 796,603, filed March 2, 1959, now Patent No. 3,069,206, granted December 18, 1962, the disclosure of which is hereby incorporated herein by this reference, discloses a hopper car arrangement for transporting flour and the like in which plenum chambers are formed over downwardly inclined corners defined by the floor and the hopper sheets forming the hopper structure funneling portions of the car. In accordance with this Borger invention, the plenum chambers are defined by gas permeable material having a sufficient permeability to permit gas supplied under pressure to said chambers to blow a swath through the flour at spaced points about the funneling portion openings, whereby complete discharge from the respective hoppers, when desired, may be achieved without mechanical agitation or manual cleaning.

The present application is directed to an improvement of various aspects of the car structure disclosed in said Borger application Serial No. 796,603.

A principal object of the present invention is to provide an improved form of plenum chamber structure that is especially adapted for application to the car disclosed in said Borger application, but which is also applicable to hoppers in general.

Another principal object of this invention is to provide an improved manner of supplying gas under pressure, such as air, to the Borger type of hopper car plenum chamber arrangement.

Yet a further important object of this invention is to provide an improved hopper discharge port control valve and sanitary cover arrangement for railroad hopper cars that are to transport edible material such as flour.

Still other objects of the invention are to provide an arrangement for adapting a more or less conventional covered hopper car structure for purposes of economically transporting pulverant materials, to provide improved methods of discharging pulverant materials from hoppers in general, and to provide a hopper car arrangement that is economical of manufacture, convenient in use and adapted to handle all types of bulk materials in the pulverant class.

Other objects, uses and advantages will be obvious or become apparent from a consideration of the following detailed description and the application drawings.

In the drawings:

FIGURE 1 is an exploded perspective view of the pertinent portions of a hopper car structure to which our invention has been applied, conventional railroad car parts being omitted, and parts being broken away for clarity of illustration;

FIGURE 2 is a fragmental perspective view of one of the hopper funneling portion discharge ports, illustrating an improved form of sanitary cover for same;

FIGURE 3 is a fragmental diagrammatic perspective view, from a somewhat different angle, of one of the hopper funneling portions, illustrating the discharge port valve structure thereof, parts being broken away and displaced to facilitate illustration, and the sanitary cover being omitted;

FIGURE 4 is a plan view of the car structure, with one half of the roof being broken away to expose the hopper structure on one half of the car;

FIGURE 5 is a side elevational view of the left hand side of the car structure shown in FIGURE 4, with parts being broken away and other parts shown in section to facilitate illustration;

FIGURE 6 is a fragmental, cross-sectional view substantially along line 6—6 of FIGURE 4;

FIGURE 7 is an enlarged sectional view through one of the hopper funneling portions, providing a showing similar to that of FIGURE 5, but on an enlarged scale;

FIGURE 8 is a fragmental sectional view along line 8—8 of FIGURE 7;

FIGURE 9 is a sectional view along line 9—9 of FIGURE 5, illustrating the piping arrangement for supplying gas to the plenum chambers of the funneling portions of the hopper structure forming a part of the car of FIGURES 1–8;

FIGURE 10 is a fragmental perspective view, on an enlarged scale, illustrating the plenum chamber forming structures that are employed in accordance with this invention to form the plenum chambers of the car of FIGURES 1–9;

FIGURE 11 is a bottom plan view of the frame member that is employed in the plenum chamber forming structure of FIGURE 10;

FIGURE 12 is a cross-sectional view along line 12—12 of FIGURE 11;

FIGURE 13 is a longitudinal sectional view through the canvas sheeting member that is employed in forming the plenum chamber forming structure of FIGURE 10; and FIGURE 14 is a diagram similar to that of FIGURE 8, but on an enlarged scale, illustrating the manner in which the plenum chamber forming structure of FIGURE 10 is applied to the car of FIGURES 1–8.

However, it is to be understod that the specific illustrations of the drawings are provided only for purposes of complying with Section 112 of Title 35, and that the invention may obviously be embodied in different forms.

*General Description*

Reference numeral 10 of FIGURES 1, 4 and 5 generally indicates a covered hopper car of the type to which the invention is applicable. The railroad car 10, aside from the inventive concepts herein disclosed, is essentially the same as the PS–2 covered hopper car made and sold by Pullman-Standard, a division of Pullman Incorporated. The car 10 includes a hopper structure 11 formed into two compartments 12 and 14 separated by a partition 16 which forms a side sheet of each compartment. The compartments are also defined by the car side walls 18 (usually made up by a plurality of welded sheets), the car end walls 20 which merge into sloping floor sheets 22 (braced by bolster webs 23), and inside and outside hopper sheets 24 and 24a. The floor sheets 26 extend between partition 16 and the hopper openings 28, to which the hopper sheets 24 and 24a and floor sheets 22 also converge. The floor sheets 22 and 26 (which in the specific form illustrated in FIGURES 4 and 5 are angled somewhat at 27) and hopper sheets 24 and 24a of each compartment define hopper funneling portions 25 including downwardly inclined bottom surfaces that lead to and converge at the two ports 28 on either side of the center sill ridge 30 that is formed in the hopper structure of the car to accommodate the center sill 32 of the car (see FIGURE 6).

It may be assumed that the car walls 18 and 20, floor sheets 22 and 26, partition 16, hopper sheets 24, and ridge 30 are fabricated and assembled in any convenient conventional manner, such as that diagrammatically illustrated, as may the remainder of the car structure not specifically described.

The car walls 18 and sheets 22, 24, 24a and 26 form downwardly inclined lines of intersection where indicated by arrows 34 and 36, respectively. These lines of intersection form corners 38 and 40; the invention of this application is applied to the corners 40.

Following the teachings of said Borger application Serial No. 796,603, the corners 40 are covered with a gas permeable material 42 to form a plenum chamber 44 which is to be connected to a suitable source of gas, such as air under pressure, for purposes of discharging a load of pulverant material from car 10.

In accordance with the present invention, the gas permeable material 42 is applied to a rigid frame structure 50 (see FIGURES 10 and 11), about the edges of which has been applied a gasketing member 52. In the illustrated form, the rigid frame 50 of each plenum chamber forming structure 53 is provided with a plurality of perforations 54 and the gas permeable material 42 is tied in place by draw strings 56 to draw the gas permeable material over the gasketing 52 and stretch same out across the frame perforations 54.

The individual frames 50 are each provided with an angled end member 57 (which include perforations 54a), about which the gasketing member 52 is applied and which are covered by the gas permeable material 42, so that when the assembled plenum chamber forming structure 53 is applied to a corner 40 in the manner indicated in FIGURES 8 and 14, and the securing bolts 60 are tightened, the plenum chamber forming structure 53 will define a plenum chamber 44 that is sealed about its periphery (and thus at its ends as well as along its sides). Perforations 54 and 54a should be distributed and of sufficient size to offer no impedance to the gas flow that is to pass through the plenum chambers.

As indicated in FIGURE 9, the individual funneling portions 25 of each compartment are associated with a pair of U-shaped gas supplied conduits 70 (which may be formed from two inch piping) that are connected together by conduit 72 provided with an appropriate form of gate valve where indicated at 74. The conduits 70 are each provided with removable pipe caps 76 and 78, any one of which may be removed to connect the conduits and thus the plenum chambers to a supply of gas, such as air under pressure.

The conduits 70 are connected to the individual plenum chambers by suitable conduits 80, shown as appropriate flanged pipe saddles 81 communicating with appropriate perforations 82 in the floor sheets 22 and 26.

This invention also contemplates the novel hopper outlet valve and sanitary cover structures shown in FIGURES 2, 3 and 7. Generally speaking, the valve arrangement includes a valve member 90 mounted for pivotal movement to one side of its midportion, thus defining a short side 92 and a wide side 94, the valve member being affixed to shaft 96 that is journalled in the respective hopper funneling portions for this purpose. In the closed position, the valve member bears against the upper and lower U-shaped abutment plates 98 and 100 (see FIGURES 7 and 9) for sealing purposes.

The sanitary cover structure comprises a plate 102 pivoted to the respective hopper funneling portions by a vertical pin 104, and which is thus adapted to swing about a vertical axis between the open position of FIGURE 2 and the closed position of FIGURE 5 in which it is latched by the latching structure diagrammatically illustrated at 106.

Cars of the type illustrated generally include a roof 110 provided with appropriate covers 112 for closing access openings or hatchways 114 (see FIGURE 1). These covers 112 may be of any suitable type and ordinarily include releasable latching devices (not shown) for securing them in their closed positions.

The car 10 is loaded in any conventional manner, after the valve member 90 and the sanitary cover 102 of each hopper funneling portion have been moved to their closed positions (see FIGURES 5 and 7). The eccentric mounting of the valve member 90 insures that the weight of the load is bearing against the larger portion of the valve member, which thus holds same in closed position against the respective abutment plates 98 and 100.

When it is desired to unload the car 10, it is readily and completely discharged by supplying under pressure to the plenum chamber 44, as by connecting one of the conduits 70 to a source of air under pressure available at an appropriate rate commensurate with the permeability of the material 42. In accordance with the invention of said Borger application, the gas permeable material 42 is made sufficiently permeable to emit a band-like air flow of sufficient volume rate to cut a swath through the pulverant material and overcome arching or vaulting tendencies it may have that would impede the flow of the pulverant material from the hopper ports or openings 28. As indicated by the arrows 115 of FIGURE 1 and FIGURE 4, the air flow from the respective plenum chambers forms or tends to form an X-shaped swath through the pulverant material pressing into the respective hopper funneling portions.

Tests have shown that the pulverant material would slide freely down the floor sheets 22 and 26 if it were not for the presence of the hopper sheets 24, so long as the slope angle is above the angle of repose of the pulverant material. However, the hopper forming sheets in directing the pulverant material laterally of the floor sheets toward the respective hopper openings, result in the pulverant material becoming wedged between the sheets forming the hopper funneling portions and, of course, across the hopper openings. The aforesaid X-shaped swath in effect severs the divergent pulverant material flows from frictional engagement with each other, with the result that the material flows freely into the hopper discharge openings as long as air is supplied to chambers 44 until the hopper funneling portions are fully discharged.

*Specific Description*

Referring to FIGURES 10–14, the plenum chamber forming structure 53 of this invention includes the rigid frame member 50, which is preferably formed from a suitable plastic or metal material shaped to approximately the illustrated configuration to define the spaced planar portions 120 in which the perforations 54 are formed, and which are separated by a central depression 122 that extends along the longitudinal center of the frame. The depression 122 is formed with a single recess or opening 124 through which the bolt 60 is applied.

The frame 50 is also formed with the downwardly turned edge portions 126 and the downwardly turned end portions 57 likewise have downwardly turned edge portions 128 (see FIGURE 11), which in effect provide a continuous abutment wall 12a about frame 50.

The end portions 57 of the frame may be integrally united therewith or separate elements welded or otherwise fixed to the frame where indicated at 130.

The gasketing member 52 is preferably a continuous element formed from, for instance, sponge rubber having a durometer on the order of 30 and provided with a continuous slit 133 to receive the wall 129 of frame 50. Of course, the length of member 52 should complement the length of frame wall 129. The gasketing member is preferably affixed to wall 129 by a suitable cement.

The gas permeable material 42 of each plenum chamber forming structure comprises an appropriately shaped sheet of spun nylon duck canvasing on the order of 14.73 ozs. per square yard in weight and having its edges turned over and stitched, as at 131, to define a continuous pocket 132 about the edge of the gas permeable material in which draw strings 56 are mounted. As indicated in FIGURES 10 and 13, two draw strings 56 are employed and each draw string extends about an end 134 of the canvasing material and has its ends 56a extending out of a suitable reinforced perforation 136 formed in the pocket 132. Of course, bolt 60 is applied to the respective frames 50 before the gas permeable material is applied, after which the individual draw strings 56 are pulled tight to draw pockets 132 over gasketing 52; the ends 56a of each draw string are then tied together as at 138.

As thus assembled, the individual plenum chamber forming structures 53 are applied to the respective corners 40, with bolts 60 inserted through holes 139 formed in such corners, after which lock nuts 141 are applied to bolts 60 to draw the structures 53 firmly against the sheets defining corners 40.

As already indicated, the hopper forming sheets 20, 22, 24, 26 and 18 and 16 may be affixed together in any appropriate manner, such as that described in said Borger application. The individual funneling portions may be braced by an appropriate reinforcement structure 140 (see FIGURE 6); the floor sheets 22 may be reinforced by appropriate angles 142 and the hopper openings in the illustrated embodiment is defined by an adapter structure 144 (affixed to the hopper funneling portions 25 in any suitable manner) that is quadrilateral in horizontal section to complement the quadrilateral valve member 90. The U-shaped abutment plates 98 and 100 may be welded approximately where indicated in FIGURES 7 and 9 immediately adjacent the lower ends of the respective plenum chamber forming structures 53 for sealing cooperation with the valve member 90.

The valve member 90 is actuated by rotating or pivoting shaft 96 (to which valve member 90 is fixed as by welding half sleeve 149 between the two) by an appropriate wrench applied to the shaft squared end 150, and the shaft 96 may be locked against displacement by applying nut 152 to pin 154 carried by a projection 156 that is fixed to the rod 96. Pin 154 projects through an arcuate slot 158 formed in latch plate 160 that is affixed in any suitable manner to the hopper funneling portion, as by welding it and brace plates 161 to the indicated hopper sheets 24.

The sanitary cover plate 102 is provided with a quadrilateral reinforcement structure 170 which is formed from appropriate plates welded together in vertical planes in the manner suggested by FIGURE 2 and oriented with respect to plate 102 to have its corners 172 disposed between corners 174 of plate 102. Plate 102 has affixed thereto a sleeve 176 that is slotted at 177 (see FIGURE 2) to receive the latch pin 178 when plate 102 is pivoted to the position of FIGURE 7, pin 178 being pivoted as at 180 to a lug 182 fixed to the hopper funneling portion and carrying suitable lock nut 184 that may be turned against the undersurface of sleeve 176 for purposes of securing plate 102 in locked position against adapter 144. Pin 104 is fixed to the respective hopper funneling portions in any suitable manner, as by brace plate 185 and has affixed thereto a disc 186 that suspends the plate 102, pin 104 being received through sleeve 187 affixed, as by welding, to plate 102. When the plate 102 is secured in place by actuating nut 184, the reinforcing structure 170, and in particular the corners 172 thereof, insure that all portions of the plate are drawn securely against the adapter structure 144.

The reinforcing structure 170 also functions to reinforce plate 102 against sag from the weight of pulverant material that may be imposed upon it.

Preferably, an appropriate seal 189 (see FIGURE 7) is affixed to the top of plate 102 for engagement with the undersurface 188 of the adapter structure 144. Seal 189 may be formed from sponge rubber or the like.

The gas permeable material 42 should have a permeability that exceeds 10, as determined by the standard permeability test (13.9 being the permeability of the canvasing material above specified). This test determines the amount of air measured in cubic feet at 70 degrees and 20 percent relative humidity which will pass through one square foot of dry permeable material in one minute when tested under an equivalent pressure differential of 2 inches of water.

In the railroad car illustrated, which was designed for handling flour, floor sheets 22, 24 and 26 have a slope on an order of 50 degrees and the individual sheets forming the respective gas permeable strips 42 have a length of 3½ feet and a width of 6 inches, with the respective frames 50 and gasketing 52 being proportioned accordingly.

When a load is to be discharged, air should be supplied to the individual plenum chambers at a minimum rate that is on the order of 12 cubic feet per minute per square foot of plenum chamber gas permeable material area. An air compressor driven by a 5 horsepower motor will develop and maintain the volume flow necessary for good operating conditions.

When a car 10 is to be unloaded, an appropriate source of gas under pressure, such as that indicated, is connected to one end of a convenient conduit 70 on either side of the car employing either a pipe end 76a or pipe end 78a, depending upon the facilities available. If both hopper funneling portions of the hopper 12 or 14 are to be discharged simultaneously, both of the valve members 90 are unlocked and moved to the open position, which permits some of the flour immediately adjacent the hopper discharge port 28 to drop out of the hopper and into the conduit that is to receive same, thus forming the familar dome shaped arch in the compacted pulverant material above the respective hopper discharge ports. With the gate valve 74 being turned to the open position, the air supplied to the conduits 70 is turned on and air passes into the respective plenum chambers 44 and emits from the gas permeable strips 42 thereof to form the aforementioned X-shaped swaths through the pulverant material above each hopper funneling portion.

The plenum chamber permeability and air flow rate above indicated will insure that air will pass through the permeable material at a sufficient rate to mechanically entrain and displace the individual particles of pulverant material and blow it physically out of the mass or body of pulverant material, and as already mentioned, this severs the side portions of the pulverant material mass from the end portions thereof (with respect to the hopper compartment side and end sheets) and in so doing, disrupts the arch and negatives the wedging effect of the converging sheets on the pulverant mass, with the result that the pulverant material will then discharge evenly out of the discharge ports.

Once the air supply is turned on, the equipment may operate continuously until the hoppers are discharged, and the time involved will depend on the capacity of the particular hopper car. Since the arrangement of this application avoids the necessity of mechanical agitation of the pulverant material or manual cleaning out of the individual hopper compartments, after the hopper compartments are emptied, they may be closed by closing valve member 90 and its sealing sanitary cover 102 in readiness to receive another load.

Suitable car seals may be applied in any suitable manner for sealing the load during transit.

Where one of the hopper funneling portions is to be emptied before the other, the hopper funneling portion on the far side of the car from the source of gas under pressure should be emptied first. Assuming that the source of air is connected to the pipe end 78a at the left hand side of FIGURE 9, the hopper funneling portion at the right hand side of the figure should thus be emptied first, and this is done by first opening the valve member 90 of the right hand hopper funneling portion and turning gate 174 to the open position. After the right hand hopper funneling portion of FIGURE 9 is emptied, the gate valve 74 is closed and the valve member 90 of the left hand funneling portion is opened. This method is preferred as air would tend to leak through the left hand hopper funneling portion and out of the top of the car if it were emptied first (assuming that the air connection is as indicated). Of course, if the air connection is to the right hand side of FIGURE 9, the operation is reversed, where one of the funneling portions is to emptied before the other.

Preferably, a fabric mesh on the order of burlap is applied over the hatchways 114 in the car roof before the pulverant material discharge operation is initiated.

It will therefore be seen that we have not only provided a simplified method and apparatus for securing complete discharge of the pulverant material from hoppers, but also, the present invention conforms to the principles of said Borger application Serial No. 796,603 and thus eliminates the need for mechanical vibrators or the use of sledge hammers to effect discharge. This invention may be applied to hopper cars of the type indicated with very little modification of their conventional design, as should now be apparent from what has been described above.

The car structure shown in the application drawings was devised for a 50 ton covered hopper car having 2565 cubic foot capacity. The car was specifically designed for handling flour, but materials such as cement, lime, graphite, etc. can also be handled with equal facility. The invention may be applied in handling any pulverant material, that is, any small particled material that tends to arch or to pack when confined within a hopper or bin-like structure and when the discharge is through an opening that is smaller than the cross section of the bin.

This application is a division of our application Serial No. 50,800, filed August 19, 1960, now Patent No. 3,069,208, granted December 18, 1962.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:

1. A hopper structure for bulk materials comprising a pair of spaced funneling portions having discharge controlling gates at the lower ends thereof, said funneling portions each being defined by downwardly inclined planar sheets defining lines of intersection forming downwardly inclined corners, a plenum chamber formed across each of said corners, said plenum chambers being defined by gas permeable material having a permeability that exceeds 10, and means for supplying gas under pressure to said plenum chambers, said means comprising a pair of U-shaped conduits secured together in back to back relation and carried by said funneling portions with each conduit being received about a funneling portion, respectively, said conduits being secured together by a further conduit having valve means mounted therein for controlling the flow of gas between the two, and conduit means connecting the plenum chambers of each funneling portion with the respective conduits, with one of the legs of each of said conduits being adapted for connection to a source of gas under pressure.

2. A railroad hopper car comprising a hopper structure including spaced funneling portions at the lower ends thereof, said hopper structure being disposed with respect to the car so that said funneling portions are spaced from each other transversely of the car, said funneling portions each being defined by downwardly inclined, converging, spaced apart floor sheets extending transversely of the car and downwardly inclined, converging spaced apart planar hopper sheets extending longitudinally of the car, said floor and hopper sheets of each funneling portion defining lines of intersection forming downwardly inclined corners, a plenum chamber formed across each of said corners, said plenum chambers being defined by gas permeable material having a permeability that exceeds 10, and means for supplying gas under pressure to said plenum chambers, said means comprising a pair of U-shaped conduits secured together in back to back relation and carried by said funneling portions with each conduit being received about a funneling portion, respectively, said conduits being secured together by a further conduit having valve means mounted therein for controlling the flow of gas between the two, and conduit means connecting the plenum chambers of each funneling portion with the respective U-shaped conduits, with one of the legs of each of said conduits being adapted to connection to a source of gas under pressure.

3. A railroad hopper car structure for carrying pulverant materials, said car structure comprising:
   a plurality of contiguous hoppers,
   each of said hoppers including a funneling portion having a quadrilateral horizontal cross-sectional configuration and terminating at its lower end in a quadrilateral discharge port,
   said funneling portions each thereby defining two pair of opposed sides and said funneling portions each being oriented with respect to said car structure such that two of the opposed sides thereof face transversely of the car and the other two opposed sides thereof face longitudinally of the car,
   each of said funneling portions including a control valve structure for opening and closing said discharge ports thereof, respectively,
   said valve structures each comprising a quadrilateral valve member journalled in the respective funneling portions adjacent the discharge port thereof,
   said valve members being respectively journalled for rotation about a generally horizontal axis that extends transversely of the car structure and is disposed to one side of the median portion of the respective valve members to thereby eccentrically mount said valve members in the respective funneling portions and define same into a short side and a long side,
   a first horizontally disposed U-shaped abutment structure secured to one side of the respective funneling portions inside same and positioned to be engaged by the long side of the respective valve members,
   a second horizontally disposed U-shaped abutment structure secured to the other side of the respective funneling portions inside same and positioned to be engaged by the short side of the respective valve members,
   said abutment structures of each funneling portion being disposed in parallel planes that are spaced apart approximately the thickness of the valve members of the respective funneling portions,
   with said second abutment structures being disposed above the respective first abutment structure,
   means for pivoting said valve members of the respective funneling portions about said axes thereof to open and close the respective discharge ports of said funneling portions, said pivoting means respectively comprising shaft means secured to the respective valve members and projecting transversely of the car structure and outwardly of the respective funneling portions, and handle means keyed to the respective shaft means and positioned adjacent the respective funneling portions on the sides thereof that face outwardly of the car structure, and means for releasably latching the respective handle means against movement from the closed positions of the respective valve members.

4. The railroad hopper car structure set forth in claim 3 including:

a sanitary cover for each of said discharge ports thereof, said covers each comprising a quadrilateral planar member pivoted to the respective funneling portions adjacent one of said other opposed sides thereof to swing about a vertical axis in a plane that is below and juxtaposed to said ports thereof, means for releasably securing said planar members over the respective ports, and a quadrilateral reinforcing structure fixed to the undersurface of said planar members, with said reinforcing structures of each cover being oriented with respect to said planar members thereof to position the corners of said reinforcing structures intermediate the corners of the respective planar members.

5. A railroad hopper car structure for carrying pulverant materials, said car structure comprising:

a plurality of contiguous hoppers, each of said hoppers including a funneling portion having a quadrilateral horizontal cross-sectional configuration and terminating at its lower end in a quadrilateral discharge port, said funneling portions each thereby defining two pair of opposed sides and said funneling portions each being oriented with respect to said car structure such that two of the opposed sides thereof face transversely of the car and the other two opposed sides thereof face longitudinally of the car, a sanitary cover for each of the respective hopper funneling portion discharge ports, said covers each comprising a quadrilateral planar member, pin means for pivoting the respective planar members to the respective funneling portions to swing about a vertical axis in a plane that is juxtaposed to but positioned below the respective ports, said axes of the respective funneling portions being disposed at one of said other opposed sides thereof, said planar members of the respective funneling portions being proportioned to close off the respective ports thereof when disposed across same and having a configuration that complements the configuration of the respective discharge ports, latch means for releasably securing the respective planar members across the respective discharge ports of the funneling portions to close off the respective ports, said latch means comprising a vertically disposed pin secured to the other of said opposed sides of the respective funneling portions and extending into the plane of movement of the respective planar members, a split sleeve secured to the respective planar members and positioned to engage the respective pins when the respective planar members are swung to their port closing positions, means for releasably securing the respective split sleeve members to the respective pins, and a quadrilateral reinforcing structure fixed to the undersurface of the respective planar members, with said reinforcing structures being oriented with respect to the respective planar members to position the corners of said reinforcing structures intermediate the corners of the respective planar members.

6. A railroad hopper car comprising a hopper structure including a funneling portion at the lower end thereof defining a discharge port, said funneling portion being defined by four downwardly inclined, converging, planar sheets, said sheets defining lines of intersection forming downwardly inclined corners leading to said port, a plenum chamber formed across each of said corners, said plenum chambers being defined by gas permeable means having a permeability that exceeds 10, means for supplying gas under pressure to said plenum chambers, a quadrilateral valve member journalled in said funneling portion adjacent the discharge port thereof, said valve member being journalled for rotation about an axis that is disposed to one side of the median portion thereof to thereby eccentrically mount said valve member in said funneling portion and define same into a short side and a long side, a U-shaped abutment structure secured to said funneling portion and positioned to be engaged by the long side of said valve member, a second U-shaped abutment structure secured to said funneling portion and positioned to be engaged by the short side of said valve member, said abutment structures being disposed in parallel planes that are spaced apart approximately the thickness of said valve member, and means for pivoting said valve member about said axis to open and close said port, and a sanitary cover for said port, said cover comprising a quadrilateral planar member pivoted to said funneling portion to swing about a vertical axis in a plane that is juxtaposed to said port, means for releasably securing said planar member over said port, and a quadrilateral reinforcing structure fixed to the undersurface of said planar member, with said reinforcing structure being oriented with respect to said planar member to position the corners of said reinforcing structure intermediate the corners of said planar member.

References Cited in the file of this patent

UNITED STATES PATENTS

| | | |
|---|---|---|
| 955,948 | Davis | Apr. 26, 1910 |
| 1,447,380 | Goetz | Mar. 6, 1923 |
| 1,618,926 | Harrison | Feb. 22, 1927 |
| 2,745,563 | Dath | May 15, 1956 |
| 3,069,206 | Borger | Dec. 18, 1962 |
| 3,069,207 | Borger | Dec. 18, 1962 |
| 3,069,208 | Green | Dec. 18, 1962 |